Jan. 3, 1967  J. H. JEFFREE  3,295,407
MICROFILM ENLARGER
Filed Aug. 13, 1963  5 Sheets-Sheet 3
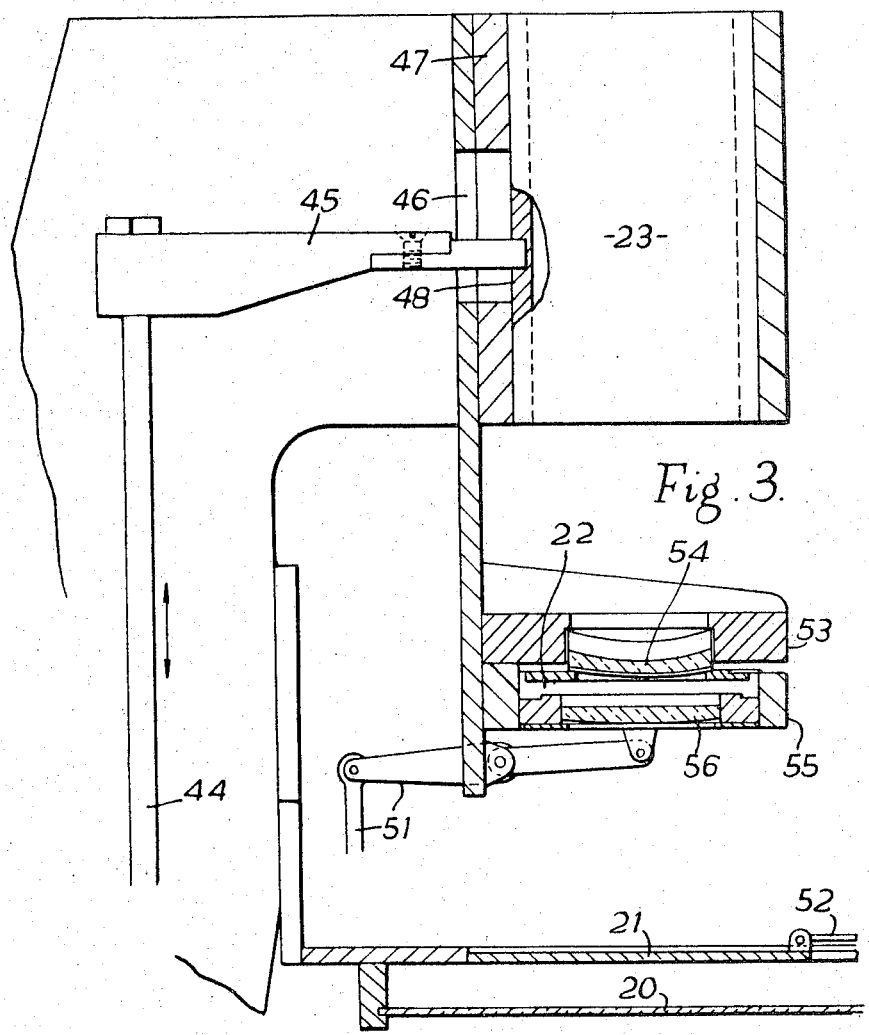
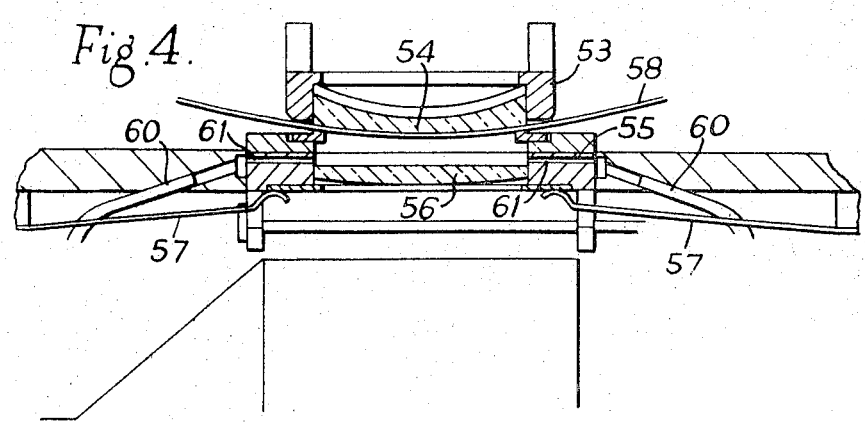

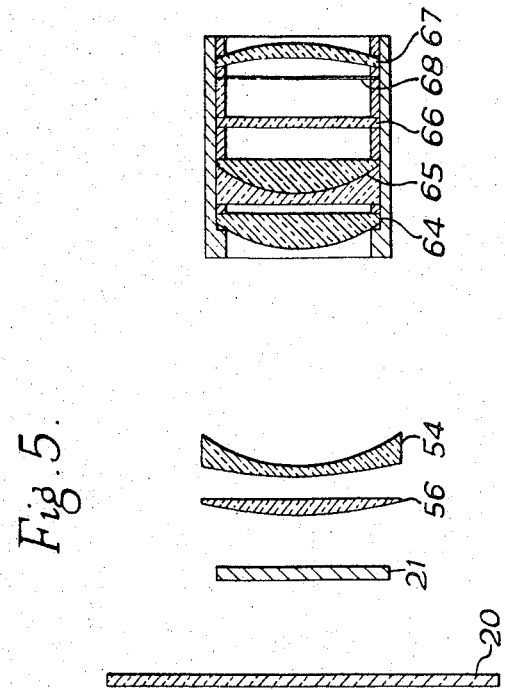
Fig. 5.
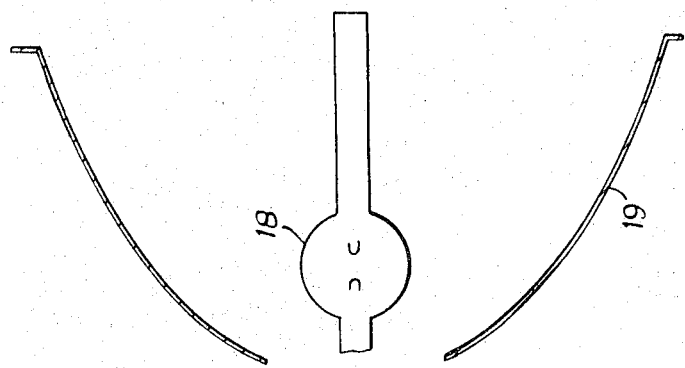

United States Patent Office 3,295,407
Patented Jan. 3, 1967

3,295,407
MICROFILM ENLARGER
John Henry Jeffree, London, England, assignor to Caps Research Limited, London, England, a British company
Filed Aug. 13, 1963, Ser. No. 301,849
Claims priority, application Great Britain, Oct. 8, 1959, 34,209/59
12 Claims. (Cl. 88—24)

The present application is a continuation-in-part of application Serial No. 59,908, filed by the present inventor and now abandoned.

This invention is for improvements in or relating to microfilm enlargers.

According to the invention a microfilm enlarger comprises a light source, a semiellipsoidal reflector surrounding the light source, a microfilm locating means and a magnifying lens system arranged in that order along the same optical axis, the reflector being disposed so as to focus an image of the centre of the light source at a point beyond a microfilm frame located at the microfilm locating means and having in the area of its reflecting surface adjacent its vertex, reticulations or deformations adapted to even out the illumination over the central part of the microfilm frame.

The deformations of the reflecting surface may suitably comprise spaced, shallow troughs extending forwardly from points near the vertex and merging with the surrounding surface in that half of the reflector adjacent its vertex. The troughs preferably all curve in a spiral fashion in the same direction and no sharp edges are formed where they merge at their ends and sides with the surrounding surface.

The ellipsoid formula of the reflecting surface of the reflector may suitably approximate to:

$$Y^2 = X (12.7 - 0.3 \times) \text{ in cm. units}$$

where

X is the axial distance of a point on the reflector surface from its vertex, and
Y is the distance of that point from the axis of the reflector taken perpendicularly from the axis.

The disposition of the reflector may be such that an image of the centre of the light source is focussed at a point from 6 to 8 centimetres beyond the microfilm frame at the microfilm locating means.

The reflector may be formed with a hole at its vertex through which a part of the light source or an electrical lead thereto may pass.

The light source used in the enlarger of the invention preferably provides a line emission of light substantially along the axis of the reflector and may be an ultra violet light source, suitably a discharge lamp.

Advantageously a shutter mounted for movement into or out of an obscuring position between the light source and the microfilm locating means is provided, which shutter transmits a minor part, e.g. about 10%, of the light for the purpose hereinafter referred to.

The light source and reflector unit may be followed by a heat absorbing filter preceding the shutter and a condenser lens may be interposed between the light source and reflector unit and the microfilm locating means, suitably between the shutter and microfilm locating means.

The invention is illustrated by the accompanying drawings in which there is shown a microfilm enlarger according to the present invention.

Referring to the drawings:

FIGURE 3 is an enlarged sectional view of certain details, including the gate of the enlarger;

FIGURE 4 is an enlarged sectional view of the gate of the enlarger taken at right angles to that of FIGURE 3;

FIGURE 5 is a view illustrating the optical projection system of the enlarger.

Figure 1:
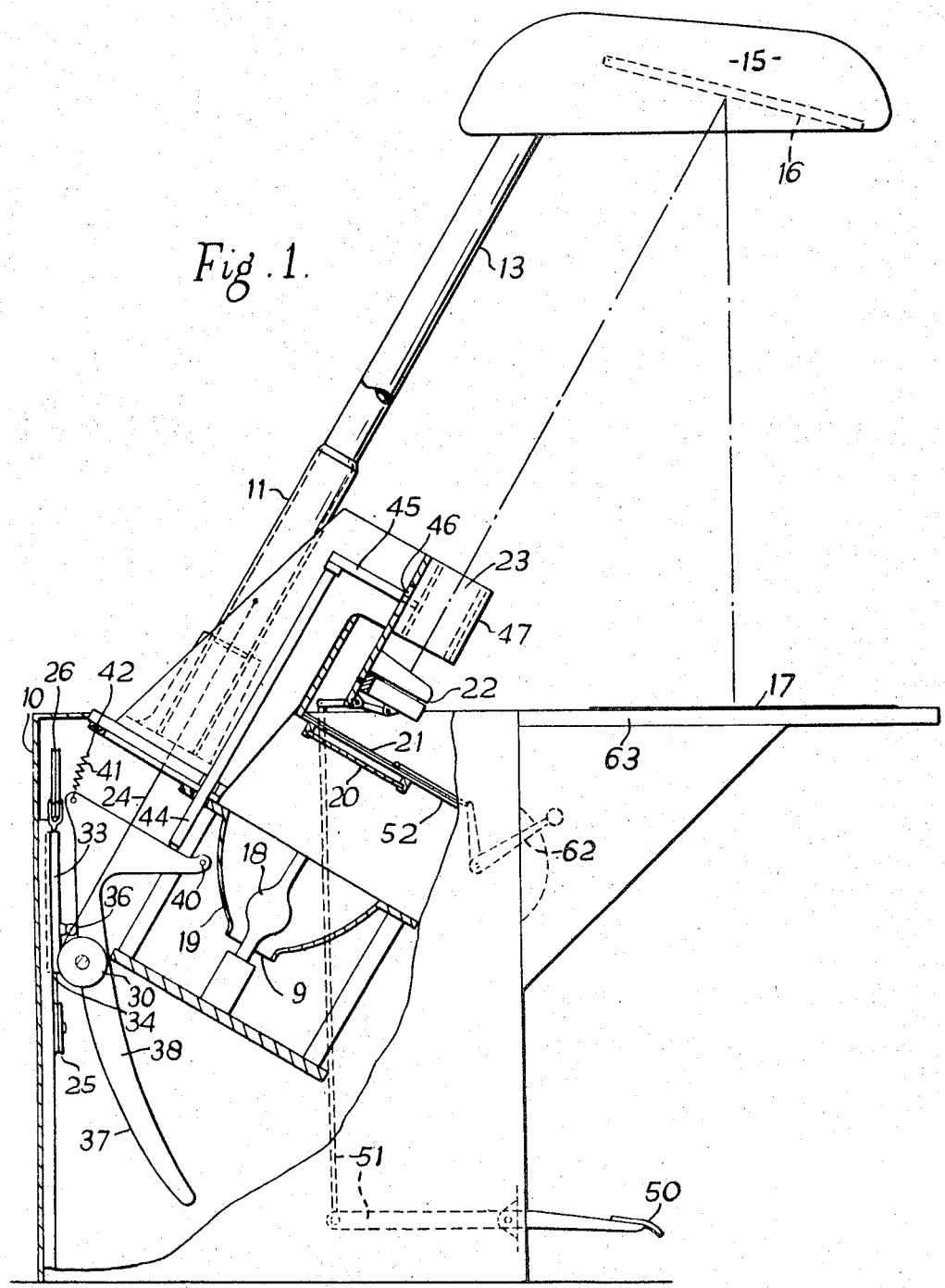
FIGURE 1 is a view in side elevation, partly broken away and sectioned, of the microfilm enlarger.
Figure 2:
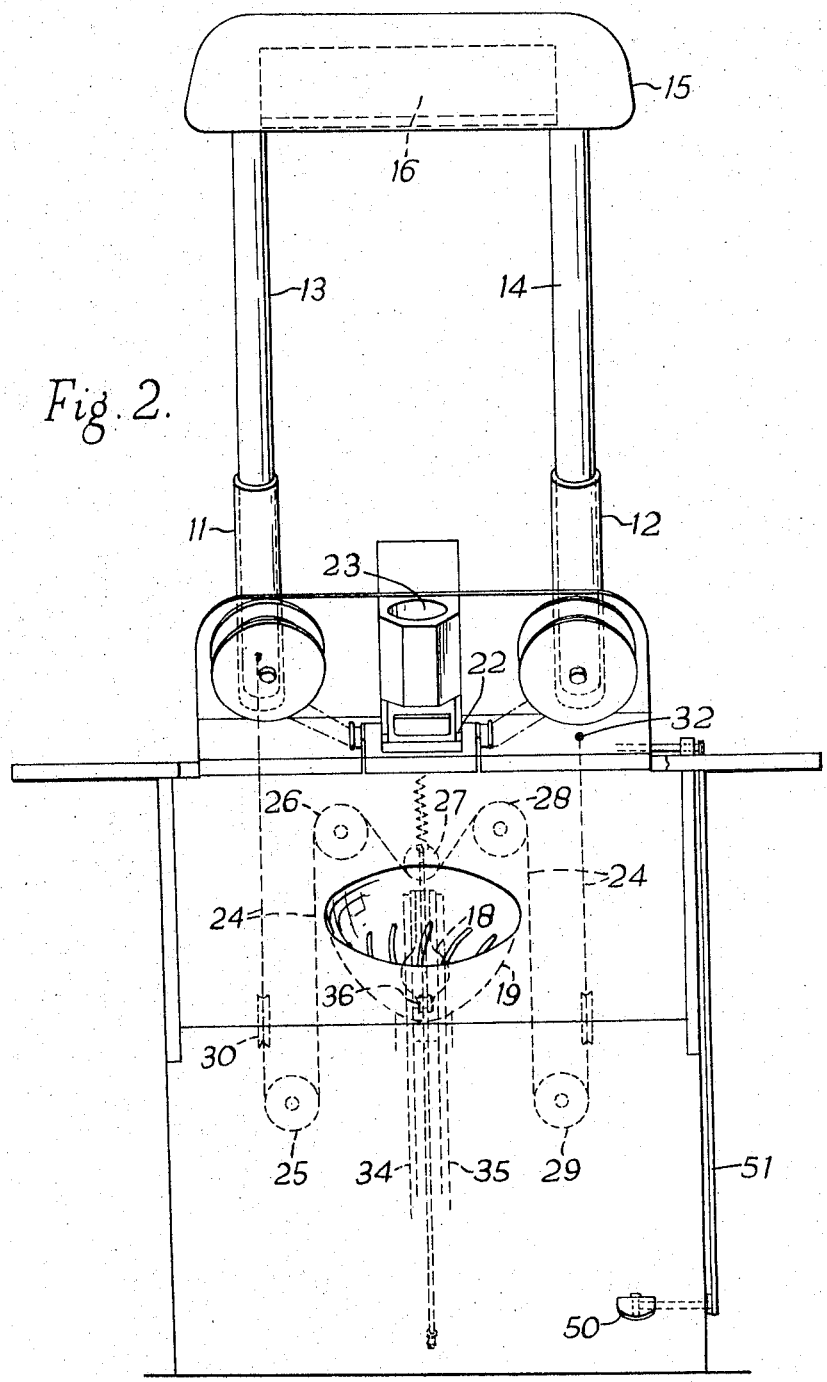
FIGURE 2 is a view in front elevation of the enlarger shown in FIGURE 1.

Referring to FIGURES 1 and 2, 10 indicates generally a framework supporting two fixed tubes 11 and 12 inclined forwardly at an angle of 30° to the vertical direction and within which slide two tubes 13 and 14 carrying a hood 15 within which is mounted a flat mirror 16 inclined upwardly from its front end at an angle of 15° to the horizontal direction. 17 is the fixed viewing or printing bed of the enlarger. 18 is a lamp, 19 a reflector, 20 a heat filter and 21 a shutter, 22 represents generally a gate incorporating a condenser lens and a gate lens and 23 represents generally the magnifying lens system of the enlarger. Connected to the tube 13 is one end of a wire 24 which passes over a series of pulleys 25, 26, 27, 28, 29 into which it is guided by pulley 30. The other end of the wire 24 is connected to the frame at 32. Pulleys 25, 26, 28, 29 and 30 are fixed in position but pulley 27 is mounted on a weighted movable trolley 33 which moves up and down in guides 34, 35. Trolley 33 carries a roller 36 which contacts the cam surface 37 of a pivoted arm 38 pivoted on pivot 40 and connected by a coiled spring 41 attached to it at point 42 to the framework. Contacting the upper surface of arm 38 at a point between 40 and 42 is a rod 44 carrying in screw-threaded relationship a forwardly extending arm 45 extending through a slot 46 in a fixed casing 47 to engage the mounting 48 of the lens system 23 which is arranged to slide within the casing 47 as can be seen in FIGURE 3.

Referring to FIGURES 3 and 4, the gate 22 consists essentially of a fixed part 53 carrying a gate lens 54 and a movable part 55 carrying a condenser lens 56. Springs 57 bias the part 55 towards part 53 to hold the microfilm 58 which passes between the parts 53 and 55, firmly in contact with the register convex surface of gate lens 54. Part 55 is moved out of its clamping position by operation of foot pedal 50 operating through linkage system 51. Cooling air may be blown into channels 60 and thence through channels 61 formed in part 55 of the gate 22 to keep the microfilm cool.

FIGURE 3 also shows more clearly the mounting 48 of the lens system 23 within the casing 47 and its connection with the arm 45 of the rod 44. It also shows the heat absorbing filter 20 and the shutter 21 which is moved into and out of position on guides 52 attached to the front of the framework 10 by operation of the lever 62 (see FIGURE 1) or by a Bowden wire connection extending beneath the table top 63 to the front thereof.

It will be seen that movement of the mirror hood 15 up or down, which may be effected manually, will result in a movement of the trolley 33 equal to half that which the mirror travels. As the pivoted arm 38 is maintained in contact with roller 36 by the action of spring 41, the arm 38 will also move about its pivot 40. The rod 44 linked to the lens system 23 maintains contact with the upper surface of the arm 38 by the action of gravity and a spring (not shown) may additionally be provided for this purpose. Accordingly any movement of the mirror 16 will result in a movement of the roller 36, arm 38, rod 44 and lens system 23. The cam surface 37 is designed so that the lens system 23 will always assume the correct focussing position relative to the position of mirror 16. Any fine adjustment required may be effected by rotating the rod 44 to vary the height of the arm 45.

In operation an enlarged image of a microfilm frame held in position in gate 22 will be projected towards the mirror 16 and will always be reflected thereby onto viewing or printing bed 17. The size of the image reflected onto bed 17 will depend on the position of mirror 16.

The movable system may be balanced so that tubes 13 and 14 and mirror 16 will remain in the adjusted position. Alternatively, locking means may be provided for locking tubes 13 and 14 in the adjusted position within tubes 11 and 12.

Referring to FIGURE 5, the operative elements of the projection system of the enlarger are illustrated, namely, the lamp 18, reflector 19, heat filter 20, shutter 21, condensing lens 56, gate lens 54 and the four elements 64, 65, 66 and 67 of the magnifying lens system 23.

Figure 6:
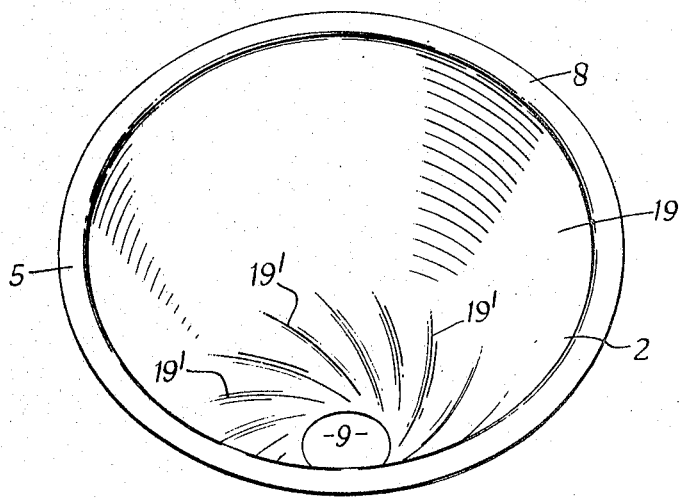
FIGURE 6 is a view looking into the reflector forming part of the optical projection system.

The lamp 18 is an ultraviolet discharge lamp with a line discharge along the axis of the reflector 19. The reflector 19 (see FIGURE 6) is formed of aluminum and is in the shape of an ellipsoid of revolution with an axial length of 10 cms. from its vertex, but with a hole 9 of 3.5 cms. diameter cut out around the vertex. Its maximum diameter is 19.5 cms. excluding the flange 8. The lamp centre is 3.5 cms. from the vertex of the reflector 19 and the focus of the lamp 18 is 34 cms. from the vertex of the reflector 19 or 30.5 cms. from the centre of the lamp. The ellipsoid formula for the reflector approximates to the formula set forth above.

The surface of the reflector surrounding the aperture 9 at the vertex is provided with smooth and regular reticulations or deformations to even out the illumination over the central part of the microfilm. In the embodiment shown (see FIGURE 1) the deformations are in the form of shallow troughs 19' all curving in the same direction in a spiral fashion and extending from the aperture upwardly of the reflector and disappearing about half-way up. The maximum depth of the troughs may suitably be 1/50 inch and they may suitably be of sinusoidal form. These troughs form a smoothly waved or corrugated surface providing an unbroken reflecting surface.

The heat filter 20 may suitably be made of Chance's ON22 glass. The shutter 21 is made of yellow glass thinly aluminized on surface facing the light source so as to reflect about 90% of the light falling on it. The lens 56 is a weak condenser lens made of fused silica.

The gate lens 54 is a negative meniscus lens 0.3 cms. in thickness, the radius of curvature of its concave surface being 5.26 cms. and of its convex surface being 20 cms. Its refractive index is 1.46. As previously stated, this gate lens 54 serves to flatten the Petzval field curvature of the lens system 23 to approximately the curvature of the convex surface of gate lens 54.

The specifications of the lenses 64, 65, 66 and 67 of the lens system 23 are as follows:

Lens 64: Planconvex; radii 4.86 cm. and ∞; thickness 1 cm.; material, hard crown glass (Chance's 519,604); refractive index 1.519.
Lens 65: Cemented doublet of dense flint glass (Chance's 620,362) and hard crown glass (Chance's 519,604). The flint glass component is planoconcave; radii ∞ and 4.09 cm.; thickness 0.3 cm.; refractive index 1.620. The crown glass component is biconvex, radii 4.09 cm. and 50.1 cm.; thickness 1 cm.; refractive index 1.519.
Lens 66: Aspheric corrector plate with first surface (i.e. surface nearest lens 64) curved according to equation $$x = 0.0076y^2 - 0.0014y^4$$

in cm. units where $x$ is departure of surface below tangent plane at centre, at distance $y$ from centre. The second surface is plane. Thickness 0.2 cm.; material, methyl methacrylate polymer (e.g. "Transpex 1" supplied by Imperial Chemical Industries Ltd.); refractive index 1.490.

Lens 67: Positive meniscus; radii 8.3 cms. concave 5.3 cms. convex; thickness 0.5 cm.; material, hard crown glass (Chance's 519,604); refractive index 1.519.

The thicknesses quoted are the axial thicknesses and the lenses and their surface are dealt with in the order in which they appear starting from the end nearest the gate lens 54. 68 is a stop forming the aperture of the system.

The lens 66, i.e. the aspheric corrector plate, serves to correct spherical aberration and the cemented doublet serves to correct chromatic aberration.

The axial distances between the facing surfaces of lenses 64, 65, 66 and 67 starting from lens 64 are 0.5 cm., 0.6 cm. and 1.6 cm. The lenses may all be 5 cms. in diameter. The axial distance of lens 64 from gate lens 54 is 6.2 cms.

The axial distance between the centre of lamp and the gate lens 54 is 24 cms. and the axial distance between the elements 20, 21, 56 and 54 may be 3.2 cms., 1.9 cms. and 1.25 cms. respectively.

The shutter 21 transmits sufficient light for viewing the enlarged image on the sensitive paper laid out on bed 17 of the enlarger without affecting the paper. On withdrawal of the shutter from the obscuring position exposure of the paper to form a latent image, which may subsequently be developed, takes place.

The light producing unit and projection lens system herein described are of particular value when utlraviolet light is used to produce enlargements on a light-sensitive material which is sensitive to ultraviolet light.

It has the advantage of providing a high output of ultraviolet light in relation to the power of the light source.

I claim:
1. A microfilm enlarger comprising a light projecting unit, formed by a semiellipsoidal reflector and a lamp, a microfilm locating means and a magnifying len system; said light projecting unit, said microfilm locating means and said magnifying lens system being arranged in that order along the same optical axis and said reflector being disposed in a position to focus an image of the center of said lamp at a point beyond a microfilm frame located in said microfilm locating means; said lamp being surrounded by said reflector and coaxial therewith; and said reflector having, in the area of its reflecting surface surrounding its vertex and solely within the inner half of said reflector adjacent its vertex, shallow deformations adapted to even out the illumination over the center part of said microfilm frame.
2. A microfilm enlarger as claimed in claim 1, in which the deformations of the reflecting surface comprise shallow troughs extending forwardly from points near the vertex and merging with the surrounding surface in that half of the reflector adjacent its vertex.
3. A microfilm enlarger as claimed in claim 2, in which the troughs all curve in the same direction in a spiral fashion.
4. A microfilm enlarger as claimed in claim 1 in which the ellipsoid formula of the reflecting surface of the reflector approximates to:

$$Y^2 = X(12.7 - 0.3X) \text{ in cm. units}$$

where
X is the axial distance of a point on the reflector surface from its vertex, and
Y is the distance of that point from the axis of the reflector taken perpendicularly from the axis.
5. A microfilm enlarger as claimed in claim 1, in which the microfilm locating means comprises a convex film register surface and a negative meniscus lens having a convex surface and a concave surface is located between the register surface and the magnifying lens system to reduce the Petzval field curvature of the magnifying lens system to an amount substantially equal to the curvature of the register surface.

6. A microfilm enlarger as claimed in claim 5, in which the convex surface of the negative meniscus lense serves as the register surface.

7. A microfilm enlarger as claimed in claim 1, in which the magnifying lens system comprises two positive lenses and, located between the two positive lenses, a cemented doublet of nearly zero power to correct chromatic aberration and an aspheric plate of nearly zero power to correct spherical aberration, the four components being arranged along a common axis and mounted to move as a single unit for focussing.

8. In a microfilm enlarger, an ultraviolet optical projection system comprising a semiellipsoidal reflector, an ultraviolet light source, a heat filter, a condensing lens, a microfilm locating means, and a magnifying lens system, arranged in that order along the same optical axis; said light source providing substantially line emission of light along the axis of said reflector and being surrounded by said reflector which is disposed in a position to focus an image of the center of said light source at a point beyond a microfilm frame located in said microfilm locating means; and said reflector having, in the area of its reflecting surface surrounding its vertex deformations comprising shallow troughs curving forwardly in a spiral fashion from points near the vertex and merging with the surrounding surface in the inner half of said reflector adjacent its vertex.

9. A microfilm enlarger as claimed in claim 8 and comprising a shutter mounted for movement into and out of an obscuring position between the light source and the microfilm locating means, said shutter transmitting a minor portion of the light when in the obscuring position which is sufficient for viewing an enlarged image projected onto a surface sensitive to ultraviolet radiation without affecting said surface.

10. A microfilm enlarger as claimed in claim 8, in which the microfilm locating means comprises a convex film register surface and a negative meniscus lens having a convex surface and a concave surface is located between the register surface and the magnifying lens system to reduce the Petzval field curvature of the magnifying lens system to an amount substantially equal to the curvature of the register surface.

11. A microfilm enlarger as claimed in claim 10, in which the convex surface of the negative meniscus lens serves as the film register surface.

12. A microfilm enlarger as claimed in claim 10, in which the magnifying lens system comprises two positive lenses and, located between the two positive lenses, a cemented doublet of nearly zero power to correct chromatic aberration and an aspheric plate of nearly zero power to correct spherical aberration, the four components being arranged along a common axis and mounted to move as a single unit for focusing.

References Cited by the Examiner

UNITED STATES PATENTS

| | | | |
|---|---|---|---|
| 1,670,837 | 5/1928 | Blackmore | 240—41.36 |
| 1,698,279 | 1/1929 | Schimpff | 240—41.36 |
| 2,688,271 | 9/1954 | Gretener | 88—24 |
| 3,076,377 | 2/1963 | Brownscombe | 88—24 |
| 3,194,112 | 7/1965 | Back | 88—24 |

NORTON ANSHER, *Primary Examiner.*

RICHARD A. WINTERCORN, *Assistant Examiner.*